United States Patent

[15] 3,705,402
[45] Dec. 5, 1972

Ballantyne et al.

[54] SECONDARY RADAR DEFRUITING SYSTEM

[72] Inventors: Jack R. Ballantyne, Santa Ana; Melvin E. Houck, Garden Grove, both of Calif.

[73] Assignee: Hughes Aircraft Company, Culver City, Calif.

[22] Filed: May 27, 1970

[21] Appl. No.: 40,984

[52] U.S. Cl. ....................343/6.5 LC
[51] Int. Cl. ....................G01s 9/56
[58] Field of Search ....................343/6.5 R, 6.5 LC

[56] References Cited

UNITED STATES PATENTS 3,182,310 5/1965 Humpherys ....................343/6.5 LC

*Primary Examiner*—T. H. Tubbesing
*Attorney*—James K. Haskell and Walter J. Adam

[57] ABSTRACT

A defruiter system useful in secondary radar applications for enabling local ground station equipment to distinguish target reply messages responsive to its interrogate signal from reply messages responsive to interrogate signals of remote ground stations. In secondary radar systems, a target transponder may at any one time be within the range of several interrogating ground stations, and therefore may be interrogated by and transmit replies to all of them. At any one ground station, the replies responsive to its own interrogation will appear at the same range during successive sweeps. However, replies initiated by interrogations from remote stations will be at unsynchronized sweep rates and will appear at the one station at different ranges during successive sweeps. This type of interference is referred to as "fruit." The subject defruiter system eliminates this fruit interference by comparing the time occurrence of framing (bracket) pulses during successive sweeps. When framing pulses during two successive sweeps match in time, then the data bits therebetween are read and the entire reply message is interpreted as being responsive to a local interrogation. Sweep-to-sweep framing pulse comparisons are performed by delaying each received framing pulse by one full sweep interval and then logically gating it with the signal received during the subsequent sweep interval.

8 Claims, 4 Drawing Figures

INVENTORS
JACK R. BALLANTYNE,
MELVIN E. HOUCK,
BY
Walter J. Adam
ATTORNEY

| | PULSE | TIME (μSEC.) | SAMPLE FF | STG 1 | 2 | 3 | 4 | 5 | 6 | 7 | 8 | 9 | n= 10 |
|---|---|---|---|---|---|---|---|---|---|---|---|---|---|
| SWEEP n | TRIGGER | 0 | | | | | | | | | | | |
| | CL (1) | 12.3 (1 MILE) | 0 | 0 | 0 | 0 | 0 | 0 | 0 | 0 | 0 | 0 | 0 |
| | CL (2) | 24.6 (2 " ) | 0 | 0 | 0 | 0 | 0 | 0 | 0 | 0 | 0 | 0 | 0 |
| | CL (3) | 36.9 (3 " ) | 0 | 0 | 0 | 0 | 0 | 0 | 0 | 0 | 0 | 0 | 0 |
| | CL (4) | 49.2 (4 " ) | 0 | 0 | 0 | 0 | 0 | 0 | 0 | 0 | 0 | 0 | 0 |
| | CL (5) | 61.5 (5 " ) | 0/1 | 0 | 0 | 0 | 0 | 0 | 0 | 0 | 0 | 0 | 0 |
| | CL (6) | 73.8 (6 " ) | 0 | 1 | 0 | 0 | 0 | 0 | 0 | 0 | 0 | 0 | 0 |
| | CL (7) | 86.1 (7 " ) | 0 | 0 | 1 | 0 | 0 | 0 | 0 | 0 | 0 | 0 | 0 |
| | CL (8) | 98.4 (8 " ) | 0 | 0 | 0 | 1 | 0 | 0 | 0 | 0 | 0 | 0 | 0 |
| | CL (9) | 110.7 (9 " ) | 0 | 0 | 0 | 0 | 1 | 0 | 0 | 0 | 0 | 0 | 0 |
| STOP | CL (10) | 123.0 (10 " ) | 0 | 0 | 0 | 0 | 0 | 1 | 0 | 0 | 0 | 0 | 0 |
| SWEEP n+1 | TRIGGER | 0 | | | | | | | | | | | |
| | CL (1) | 12.3 (1 MILE) | 0 | 0 | 0 | 0 | 0 | 0 | 1 | 0 | 0 | 0 | 0 |
| | CL (2) | 24.6 (2 " ) | 0 | 0 | 0 | 0 | 0 | 0 | 0 | 1 | 0 | 0 | 0 |
| | CL (3) | 36.9 (3 " ) | 0 | 0 | 0 | 0 | 0 | 0 | 0 | 0 | 1 | 0 | 0 |
| | CL (4) | 49.2 (4 " ) | 0 | 0 | 0 | 0 | 0 | 0 | 0 | 0 | 0 | 1 | 0 |
| | CL (5) | 61.5 (5 " ) | 0/1 | 0 | 0 | 0 | 0 | 0 | 0 | 0 | 0 | 0 | 1 |
| | CL (6) | 73.8 (6 " ) | 0 | 1 | 0 | 0 | 0 | 0 | 0 | 0 | 0 | 0 | 0 |
| | CL (7) | 86.1 (7 " ) | 0 | 0 | 1 | 0 | 0 | 0 | 0 | 0 | 0 | 0 | 0 |
| | CL (8) | 98.4 (8 " ) | 0 | 0 | 0 | 1 | 0 | 0 | 0 | 0 | 0 | 0 | 0 |
| | CL (9) | 110.7 (9 " ) | 0 | 0 | 0 | 0 | 1 | 0 | 0 | 0 | 0 | 0 | 0 |
| STOP | CL (10) | 123.0 (10 " ) | 0 | 0 | 0 | 0 | 0 | 1 | 0 | 0 | 0 | 0 | 0 |

FIG. 4.

SECONDARY RADAR DEFRUITING SYSTEM

The invention herein described was made in the course of or under a Contract or Subcontract thereunder with the Air Force.

BACKGROUND OF THE INVENTION

This invention relates generally to secondary surveillance radar systems and, more particularly, to a subsystem for eliminating interference at one interrogating station caused by the reception of target reply messages responsive to interrogations from other stations.

Secondary surveillance radar systems are useful in many applications, perhaps the most significant being for the control of civilian air traffic as part of the Common Air Traffic Control System of the Federal Aviation Agency. In this system, an interrogating transmitter at a fixed ground station periodically transmits a signal which is detected by transponders carried by local targets, i.e., aircraft within the range of the ground station and the transponders in turn transmit a coded reply which is then used as an ordinary radar echo to determine range. The reply however, will additionally contain data expressing identification or altitude information, for example. The reply format is normally comprised of first and second framing pulses spaced by a precisely timed interval of, for example, 20.3 microseconds. Thirteen data bits are respectively represented by the occurrence or non-occurrence of pulses occurring with thirteen bit time slots successively defined during the 20.3 microsecond interval between the leading edges of the first and second framing pulses.

Oftentimes, a particular aircraft may simultaneously be within the range of two or more interrogating stations and thus it will be interrogated by and transmit reply messages to all such stations. At any one ground station, the replies responsive to its own interrogation will appear at the same range during successive sweeps. However, replies initiated by interrogations from remote stations will be at unsynchronized sweep rates and will appear at the one station at different ranges during successive sweeps. This type of interference is referred to as "fruit" (see Introduction to Radar Systems, Noel I. Skolnick, 1962, McGraw Hill Book Co., p. 598).

Defruiter systems, i.e., systems for eliminating the type of interference known as "fruit," are known in the prior art which operate on a pulse-to-pulse basis. That is, in such systems all 15 bits of two or more replies received at the same range on sequential sweeps must be identical if the reply is to be accepted as valid. For a two sweep defruiter, 15 bits of information must therefore be stored for each unit of range resolution. Storage of this many bits requires a large memory capacity and therefore a large amount of hardware.

SUMMARY OF THE INVENTION

The present invention is directed to an improved system for avoiding the so called "fruit" interference in secondary radar systems.

Systems in accordance with the present invention perform defruiting on a frame-to-frame basis. That is, only the framing pulses of a reply message at a given range are correlated with the framing pulses of a reply message during a subsequent sweep at the same range.

Thus, for a two sweep system, only one bit need be stored for each unit of range resolution.

In the preferred embodiment of the invention, a shift register is provided whose length is selectable by a range select means. That is, the number of active shift register stages utilized is determined by the desired maximum effective range and the desired range resolution. During each sweep, shifting is initiated at range time zero, i.e., the time at which the first framing pulse reply would be received from a transponder at range zero, and when receipt of the first reply pulse is recognized, a binary "1" is loaded into the first stage of the shift register. The shift register keeps shifting until the bit in stage 1 at range time zero has been shifted to stage *n*. Shifting then stops and is initiated again at range time zero during the next sweep. The output of the shift register is logically ANDed with the input thereto, and since the shift register functions to introduce a delay corresponding to one sweep interval, the logical AND function will be true only if a framing pulse is received during the second sweep corresponding to the same range as the framing pulse received during the prior sweep. When this occurs the reply message is accepted as being valid.

BRIEF DESCRIPTION OF THE DRAWINGS

FIG. 4 is a tabular chart illustrating the manner in which the shift register of FIG. 3 functions to delay a framing bit by one sweep interval.

DESCRIPTION OF THE PREFERRED EMBODIMENTS

Figure 1:
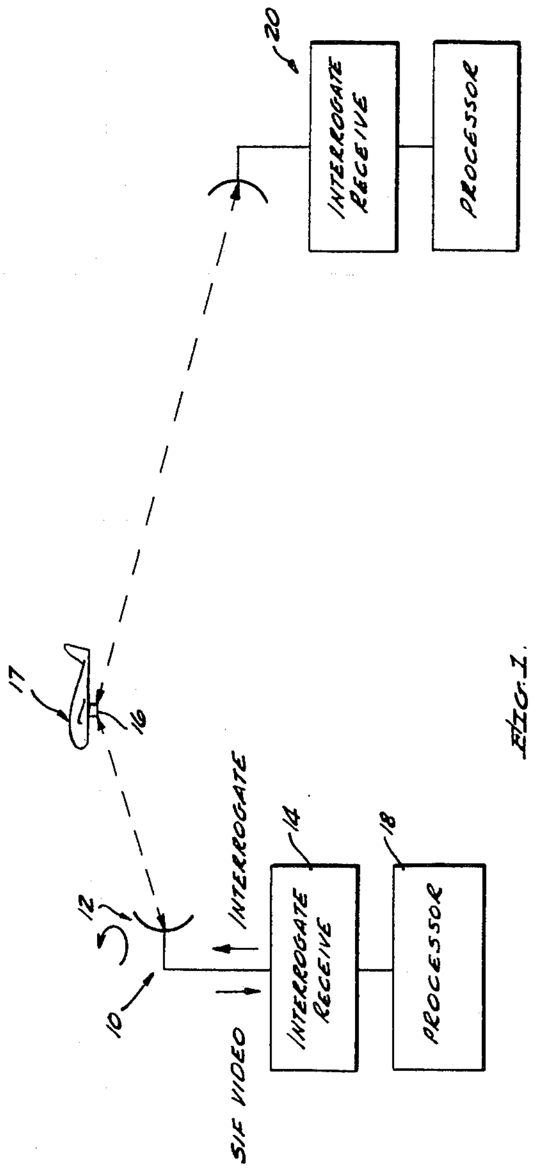
FIG. 1 is a schematic block diagram of a secondary surveillance radar system which can advantageously employ the teachings of the present invention.

Attention is now called to FIG. 1 of the drawings which illustrates a block schematic diagram of a secondary surveillance radar system which can advantageously utilize the teachings of the present invention. The exemplary system illustrated in FIG. 1 is useful for the surveillance of targets, i.e., aircraft within the vicinity of a ground station 10. A scanning antenna 12 is mounted at the ground station 10 and an interrogate/ receive means 14 is connected to the antenna for causing the antenna to periodically transmit interrogate signals and for accepting reply signals from the antenna.

More particularly, as will be described in greater detail hereinafter, the interrogate/receive means periodically transmits an interrogate signal via the antenna 12. The time duration between successive interrogate signal transmissions will hereinafter be referred to as a sweep interval. The interrogate signals will be recognized by a transponder unit 16 carried by an aircraft 17 and the transponder in turn will transmit a reply message to the antenna 12. The reply message can be used as an ordinary radar echo to determine the range of the aircraft 17 from the antenna 12. In addition, however, the reply message in secondary radar systems will normally include a plurality of data bits which, for example, can identify the particular aircraft. The reply message received by the antenna 12 (sometimes hereinafter referred to as selective identification feature [SIF] video) is coupled to a processor 18 which can then process the data with respect to all of the aircraft within the vicinity of the ground station 10.

In some situations, a second ground station 20 may be located sufficiently close to the ground station 10 so that the aircraft 17 is simultaneously within the range of both stations. In this situation, the transponder 16 will receive interrogate signals from both ground stations 10 and 20 and will in turn transmit reply signals back to both stations. Thus, each ground station will receive reply signals not only in response to its own interrogate signals, but also in response to interrogate signals from the other station. This type of interference is often referred to as "fruit" and it is the primary object of the present invention to provide defruiting apparatus, i.e., apparatus for eliminating this interference, or in other words, for enabling the equipment at ground station 10, for example, to distinguish replies responsive to its interrogations from replies responsive to interrogations of other stations.

Figure 2:
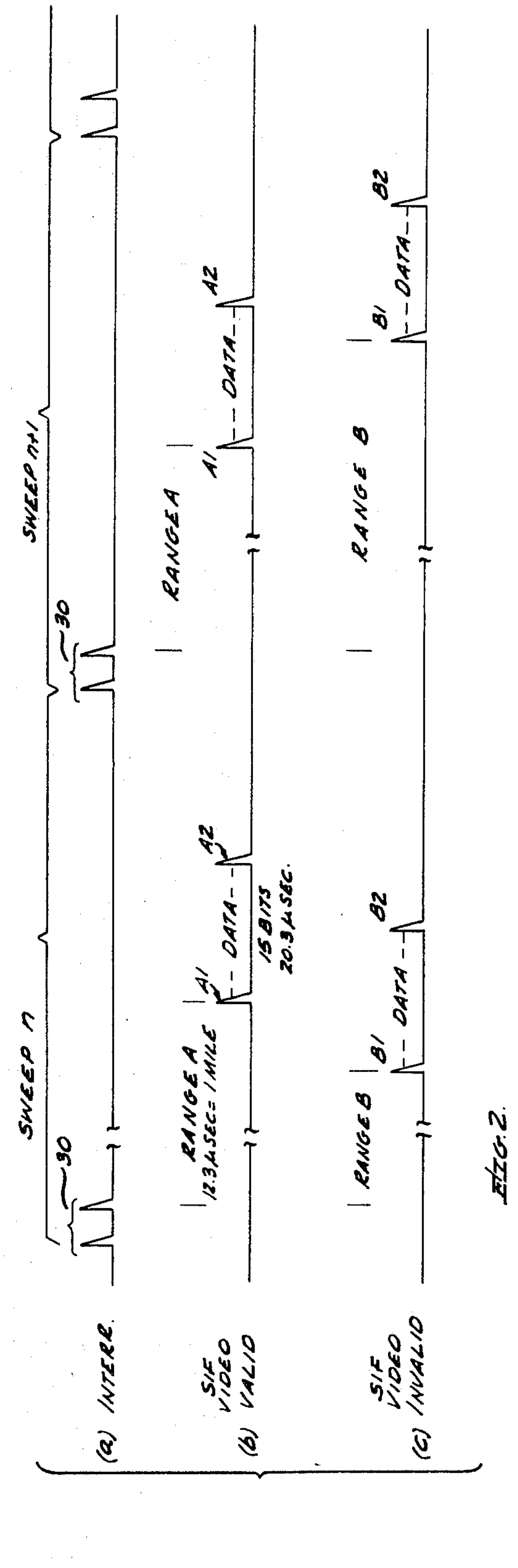
FIG. 2 is a waveform diagram illustrating exemplary signals which may typically occur in the system of FIG. 1.

Attention is now called to FIG. 2 which illustrates exemplary waveforms which typically occur in the system of FIG. 1. In the consideration of the waveforms of FIG. 2, it will be assumed that ground station 10 is the local station and that the waveforms shown in FIG. 2 are those transmitted from and received at ground station 10. For nomenclature purposes, ground station 20 will be referred to as the remote station.

Line (a) of FIG. 2 illustrates an exemplary interrogate signal 30 periodically transmitted by the local ground station 10. As shown in FIG. 2, the interrogate signal 30 is comprised of a pair of pulses spaced by a precise time interval. The transponder 16 carried by the aircraft 17 is responsive to a pulse pair spaced by such an interval and in turn transmits a reply message. The interrogate signals 30 are periodically transmitted at a sweep rate which is unique to a particular station. Line (*a*) of FIG. 2 illustrates two successive sweep intervals designated *n* sweep and sweep *n*+1. Each sweep interval is defined by the time duration between the leading edges of the first pulse of successive interrogate signals 30. It is as a consequence of the sweep interval defined by different ground stations being different, that reply messages received at one ground station in response to its own interrogations can be distinguished from reply messages responsive to interrogations from other ground stations.

The reply message format in accordance with the afore-mentioned Common Air Traffic Control System is comprised of fifteen bits including first and second framing bits, spaced by a precise 20.3 microsecond interval, with thirteen data bits being contained therebetween. A 1.45 microsecond time slot is assigned to each of the different data bits and the occurrence of a pulse within a time slot represents a "1" data bit, while the non-occurrence of a pulse represents a "0" data bit. The data bits can represent idenfiication or azimuth information, for example.

Line (*b*) of FIG. 2 illustrates a valid reply message responsive to the interrogations of line (*a*) Line (*c*) illustrates an invalid reply which is not responsive to the interrogate signals of line (*a*). The first framing pulse (A1) shown in line (*b*) can be used as an ordinary radar echo to determine the range of the aircraft 17 from the ground station 10. Thus, based on the assumption that the transponder 16 responds immediately to the interrogate signal 30, then the time interval between transmission of the second interrogate signal pulse and the receipt of the first framing pulse A1 at the ground station 10 represents the range of the aircraft 17 from the ground station 10. As indicated in line (*b*) of FIG. 2, 12.3 microseconds represents one mile of range.

If the reply signals received at ground station 10 are responsive to interrogations initiated by ground station 10, then the range information derived during two successive sweeps (*n* and *n* +1) will be substantially the same. This situation is shown in line (*b*) of FIG. 2. However, as a consequence of the sweep rate of the remote station 20 being different from the sweep rate of the local station 10, if the received reply signals are in response to remote station interrogations, then they will bear no consistent relationship from sweep to sweep of the local station. Thus, as shown in line (c) of FIG. 2, during sweep n, a certain range determination will be made which will be markedly different from the range determination made during the subsequent sweep *n* +1.

Figure 3:
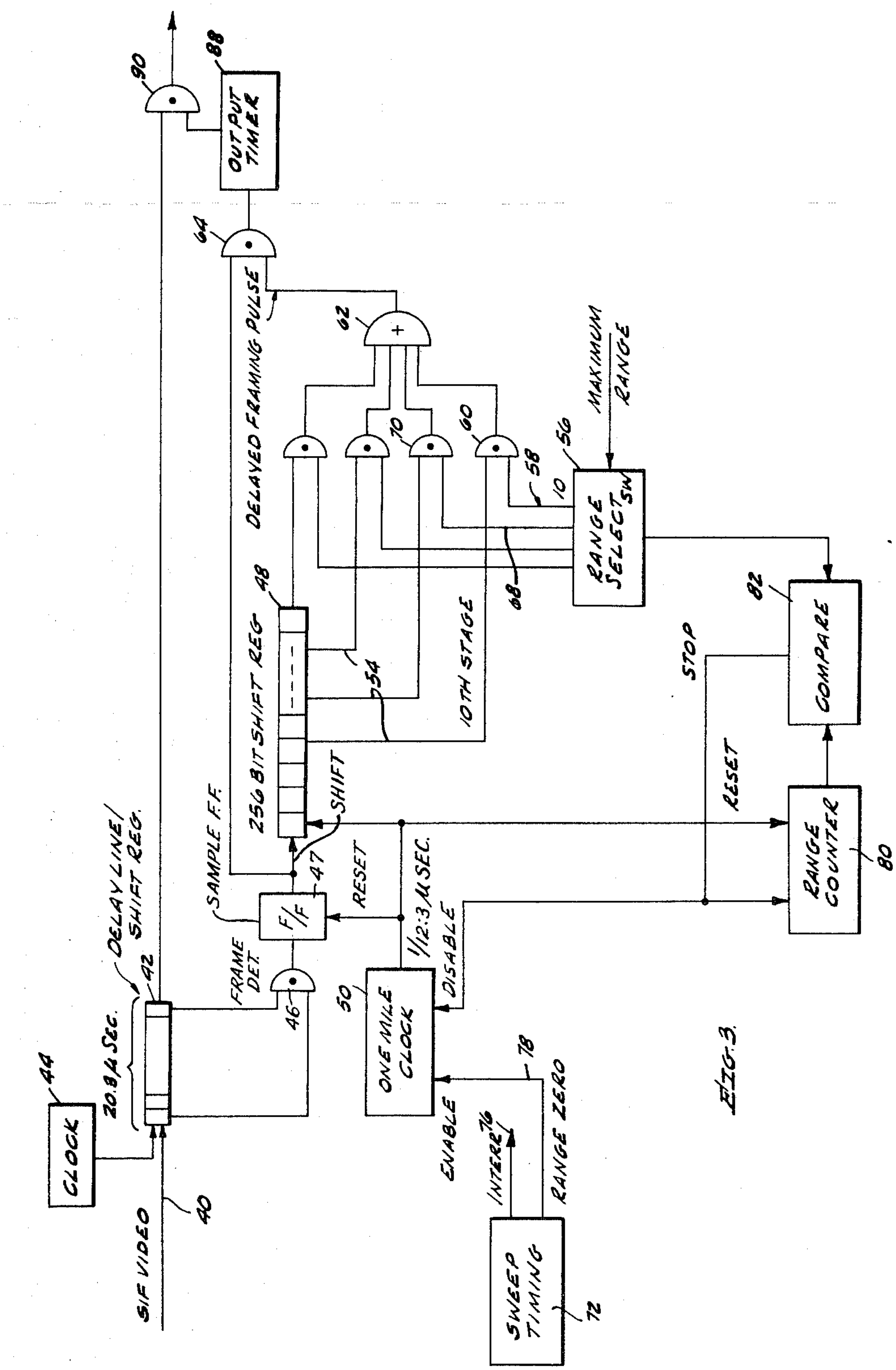
FIG. 3 is a block diagram illustrating a preferred defruiter embodiment in accordance with the present invention.

In accordance with the present invention, apparatus is provided as shown in FIG. 3 for storing information representing the time occurrence of a framing pulse during one sweep interval, and for providing that information during a succeeding sweep interval to determine whether a framing pulse is received in a corresponding portion of that succeeding interval. More particularly, the received reply signals, i.e., SIF video, are applied to input terminal 40 of a fifteen bit shift register or delay line 42. The shift register 42 is clocked by clock pulse source 44 so as to shift the contents thereof one bit stage to the right each 1.45 microseconds. It will be recalled that 1.45 microseconds is the duration of one bit time slot of the reply message format. The first and fifteenth stages of the register 42 are monitored by a frame detect AND gate 46 which provides a true output pulse whenever SIF video pulses are spaced by the precise 20.3 microsecond framing interval. The output of the frame detect AND gate 46 is applied to a sample flip flop 47 which in turn applies a signal to the input of a variable length shift register 48 to load a binary "1" into the first stage thereof when a frame is detected. The shift register 48 is used, in accordance with the present invention, to delay the framing pulse detection by exactly one sweep interval. The sample flip flop 47 may be any suitable unclocked flip flop having a reset input.

A clock pulse source 50 provides shift pulses to the shift register 48 at 12.3 microsecond intervals to thereby define a range resolution unit of 1 mile. This means that if the range determinations made during two successive sweep intervals are within 1 mile of each other, then the reply message will assume to be responsive to the local interrogation signals. If a smaller range unit resolution is desired, then the frequency of the clock source 50 can be increased. For example, if a range resolution unit of ½ mile is desired, then the frequency of the clock pulse source 50 should be doubled. The shift register 48 is indicated as having 256 stages. However, as has been mentioned, the shift register 48 is a variable length register in that it is provided with a plurality of output taps 54 at various stages thereon which can be selected to effectively shorten the register length. Thus, for example, if the local station 10 only desires information with respect to aircraft within a 10 mile range, then it is only necessary that the register 48 have eleven stages. The length of the register 48 is determined by a range select switch 56 into which a maximum range count can be loaded. For exemplary purposes herein, it will be assumed that this maximum range count is equal to 10 miles. Thus, the range select switch 56 will provide a true signal on its output select line 58, corresponding to a selected 10 mile range, to enable tap select gate 60. The output of the tenth stage of register 48 is also connected to the input of gate 60. The output of gate 60 is connected to the input of an OR gate 62 which in turn is connected to the input of an AND gate 64. The sample flip flop 47 which may receive input data at any time during the one-mile interval may receive shift pulses as reset terms from the clock 50.

It is pointed out that the range select switch 56 has a plurality of output select lines, each uniquely connected to a different AND gate corresponding to the previously mentioned AND gate 60. Thus, for example, output select line 68 can be connected to the gate 70 for defining a maximum range of 24 miles, for example. In this case, the output of shift register stage 25 will be connected to the input of gate 70. The output of gate 70 is connected to the input of OR gate 62 in the same manner as the output of gate 60. For the sake of clarity, it is pointed out that at any one time, only one maximum range will be defined, and thus only one of the gates connected to the input of OR gate 62 will be enabled to define the length of the shift register 48.

In order for the shift register 48 to delay the framing pulse applied to stage 1 thereof, by one sweep interval, it is necessary to provide sweep interval timing to register 48. For this purpose, one output of the sweep timing means 72 is connected to the enable input terminal of the clock pulse source 50. More particularly, the sweep timing means 72 provides an interrogate timing signal on output terminal 76, and a range zero trigger signal on output terminal 78. The range zero trigger signal will occur 20.3 microseconds after the second pulse of the interrogation signal 30 is generated. In other words, the range zero trigger signal is generated at a time when the second framing pulse of a reply signal will be received from an aircraft at a range equal to zero from the local ground station. The range zero trigger signal enables the clock pulse source 50 to shift the contents of the register 48 one bit stage to the right each 12.3 microseconds. In addition, the clock pulse source 50 provides clock pulses to range counter 80 which counts the pulses provided subsequent to the occurrence of the range zero trigger.

A compare circuit 82 is provided to sense when the count defined by range counter 80 is equal to the maximum range count defined by the range select switch 56. Inasmuch as it has been assumed that the range select switch 56 is set to a count of 10 miles, then the compare circuit 82 will provide an output signal when the range counter 80 counts 10 pulses from the clock pulse source 50 subsequent to a range zero trigger signal. The output of the compare circuit 82 is applied to a disable input terminal of the clock pulse source 50 to terminate shifting in register 48 until a range zero trigger signal again occurs. In addition, the output of the compare circuit 82 resets the range counter 80.

Thus, during each sweep interval, the sweep timing means 72 will provide a range zero trigger signal which will cause shifting in the shift register 48 and counting in the range counter 80. Thus, the contents of the shift register will be shifted one stage to the right in response to each pulse provided once every 12.3 microseconds by the clock source 50. Additionally, the range counter 80 will count the pulses provided by the clock source 50. When the range counter 80 counts up to the maximum range set into the range select switch 56, assumed herein to be 10 miles, then the shift register 48 will be disabled and the range counter will be reset. At this time, any framing pulse detected within that 10 mile range will be stored somewhere within the first ten stages of the shift register 48. During the succeeding sweep interval, a range zero trigger will be provided to again initiate shifting in the shift register 48 and counting in the range counter 80. The framing pulse bits stored within the shift register during the preceding sweep will then subsequently be read out through the OR gate 62. If a framing pulse is detected by gate 46 during the succeeding sweep while the framing pulse bit from the preceding sweep is stored within the maximum selected stage of the shift register, then the gate 64 will be enabled to provide a true output signal to an output timer 88. Output timer 88 will then provide a true output signal for a succeeding thirteen bit period in order to read the thirteen data bits, following the first framing pulse, from the shift register 42 through the AND gate 90.

In order to better understand the operation of the embodiment of FIG. 3, attention is called to FIG. 4 which in tabular form illustrates the typical contents of the shift register 48 during ten shift periods over two successive sweeps. It is assumed in FIG. 4 that a framing pulse is detected from an aircraft and stored in the sample flip flop at a range between four and five miles from the ground station. During sweep n, assume that when the range zero trigger signal is generated that the initial ten stages of the shift register 48 all store a binary "0." Then, as each pulse is provided from the clock pulse source 50, the contents of the stages represented in FIG. 4 are shifted one stage to the right. It will be recalled from FIG. 3 that when the frame detect gate 46 detects a pulse, it loads a "1" into the sample flip flop. As shown in the example of FIG. 4, no pulse is provided by the gate 46 until at least 49.2 microseconds after the range zero trigger signal occurs. The pulse that is in the sample flip flop is then provided to the shift register 48 is loaded into the leftmost stage and then is subsequently shifted one stage to the right in response to each pulse provided by clock pulse source 50. Thus, it will be noted that a binary "1" entered into the sample flip flop subsequent to the fourth clock pulse during sweep *n* will be in stage 5 when the stop pulse provided by the compare circuit 82 occurs. As previously pointed out, the clock pulse source 50 will be disabled in response to the stop pulse and then will be enabled again by the range zero trigger during sweep *n*+1. It will be noted that as a consequence, the binary "1" will be shifted into shift register stage $n$ (herein 10) after clock pulse four of the sweep interval n. If a framing pulse is detected by gate 46 between clock pulses four and five of sweep interval $n+1$, it means that the range data during the two sweep intervals correlates and that the replies must therefore be in response to an interrogation from the local station. As a consequence, AND gate 64 will be enabled to read out the bis of the reply message through the gate 90.

From the foregoing, it should be appreciated that the system has been disclosed herein for avoiding so called "fruit" interference in secondary radar systems. Defruiting is performed in accordance with the invention by comparing the occurrence of framing pulses only during two successive sweep intervals.

What is claimed is:

1. A system useful in secondary radar systems for comparing the range associated with reply messages received during two successive sweep intervals wherein each of said reply messages includes a framing pulse, said system including:

means for detecting a framing pulse;

delay means responsive to the detection of a framing pulse for subsequently providing a delayed framing pulse delayed by the duration of one sweep interval, said delay means including a shift register comprised of stages 1, 2, 3, . . . $n$ and wherein said delayed framing pulse is represented by the state of stage n, said delay means being coupled to said means for detecting a framing pulse, for receiving a binary "1" in said stage 1;

means selectively providing shift pulses to said shift register at a rate to shift a bit from stage 1 to stage $n$ during one sweep interval; and utilization means responsive to the detection of a framing pulse concurrently with the provision of a delayed framing pulse.

2. The system of claim 1 wherein each of said reply messages is comprised of a plurality of bits represented by the occurrence or non-occurrence of a pulse in each of a plurality of successive time slots including first and second framing bit time slots spaced by a group of data bit time slots; and wherein said means selectively providing shift pulses includes control means for providing said shift pulses at a rate less than the rate at which said bit time slots occur.

3. The system of claim 1 including:

sweep timing means providing one range zero signal during each of said sweep intervals; and wherein said means selectively providing shift pulses includes clock means responsive to said range zero signal for applying said shift pulses to said shift register.

4. The system of claim 3 including:

range select means for defining a desired maximum range count;

range counter means for counting said shift pulses occurring subsequent to a range zero signal; and means for preventing the application of said shift pulses to said shift register after said range counter means counts to said maximum range count.

5. The system of claim 4 wherein the bit length of said shift register is related to said maximum range count defined by said range select means.

6. A system useful in secondary radar applications for separating a reply message received at one station in response to local interrogations from reply messages received in response to interrogations initiated by other stations wherein said reply messages are each comprised of a plurality of bits represented by the occurrence or non-occurrence of a pulse in each of a plurality of successive time slots including first and second framing bit time slots spaced by a group of data bit time slots, said system including:

a shift register having a plurality of stages respectively identified as 1, 3, . . . $n$;

sweep timing means successively defining sweep intervals and including means for generating an interrogate signal and a range zero during each of said sweep intervals;

clock means responsive to said range zero signal for subsequently providing shift pulses for selective application to said shift register for shifting a bit through said n shift register stages in one sweep interval;

means for detecting the occurrence of a framing bit pulse including gating means responsive to he detection of a framing bit pulse for applying a binary "1" to the shift register stage 1; and utilization means responsive to the detection of a framing bit pulse while shift register stage $n$ concurrently stores a binary "1."

7. The system of claim 6 including:

range select means for defining a desired maximum range count;

range counter means for counting said shift pulses occurring subsequent to a range zero signal; and means for preventing application of said shift pulses to said shift register after said range counter means counts to said maximum range count.

8. The system of claim 7 including means for varying the length of said shift register dependent on the value of said maximum range count defined by said range select means.

* * * * *